(12) United States Patent
Okumura et al.

(10) Patent No.: US 7,651,160 B2
(45) Date of Patent: Jan. 26, 2010

(54) VEHICLE SEAT

(75) Inventors: Yasuyuki Okumura, Toyota (JP);
Teruyuki Hadatsuki, Toyota (JP);
Noboru Kadokura, Yokosuka (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/361,135

(22) Filed: Jan. 28, 2009

(65) Prior Publication Data

US 2009/0200840 A1    Aug. 13, 2009

(30) Foreign Application Priority Data

Feb. 8, 2008    (JP) .............................. 2008-029038

(51) Int. Cl.
*A47B 39/00*    (2006.01)
(52) U.S. Cl. ..................... 297/163; 297/135; 297/173; 297/146; 297/147; 108/42
(58) Field of Classification Search .............. 297/135, 297/146, 147, 163, 173; 108/42, 152
See application file for complete search history.

(56) References Cited

U.S. PATENT DOCUMENTS

| | | | | | |
|---|---|---|---|---|---|
| 1,809,866 | A | * | 6/1931 | Riesche | 108/38 |
| 2,173,569 | A | * | 9/1939 | Troendle | 297/146 |
| 2,881,039 | A | * | 4/1959 | Guzman | 297/163 |
| 5,775,655 | A | * | 7/1998 | Schmeets | 248/240 |
| 5,857,740 | A | * | 1/1999 | Duboulet | 297/163 |
| 5,947,033 | A | * | 9/1999 | Lombardo | 108/44 |
| 6,279,800 | B1 | * | 8/2001 | Lee | 224/276 |

FOREIGN PATENT DOCUMENTS

DE    10342409 A1    4/2005

OTHER PUBLICATIONS

English language Abstract and translation DE 10342409 A1 (Apr. 7, 2005).

* cited by examiner

*Primary Examiner*—Laurie K Cranmer
(74) *Attorney, Agent, or Firm*—Greenblum & Bernstein, P.L.C.

(57) ABSTRACT

The present invention can include a vehicle seat having a table, the table including a table main body, a shaft member, a first hinge structure that pivotably connects the table main body to one face of the vehicle seat and a second hinge structure that pivotably connects the shaft member to the one face of the vehicle seat. The table main body includes a holding member which is capable of slidably holding a front end portion of the shaft member and a lock member which is capable of engaging with the shaft member, and the lock member is provided at a position different from the holding member. Further, the table main body is movable between a containing position constituting a state of facing the one face of the vehicle seat and a using position constituting substantially a horizontal state by movement of the shaft member, and the lock member is engaged with a front end side portion of the shaft member at the using position and engaged with a back end side portion of the shaft member at the containing position.

7 Claims, 6 Drawing Sheets

VEHICLE SEAT

This application claims priority to Japanese patent application serial number 2008-29038, the contents of which are incorporated herein by reference.

BACKGROUND OF THE INVENTION

1. Field of the Invention

The present invention relates to a vehicle seat having a table.

2. Description of the Related Art

A type of a vehicle seat having a table is described in German Patent Publication No. 10342409. The vehicle seat includes a seat-cushion, a seat-back and a bracket 280 (refer to FIG. 6). The bracket 280 is attached to a back face of a seat-back. The table includes a table main body 120 and a shaft 160. The table main body 120 is pivotably attached to the bracket 280 by way of a hinge pin 350. The shaft 160 (substantially in U-like shape) is pivotably attached to a lower portion (projected portion substantially in a semicircular shape) of the bracket 280.

A back face 360 of the table main body 120 is provided with a holding portion 320 and two lock members (a first lock member 220 and a second lock member 240). The holding portion 320 is a member for slidably holding a front end of the shaft 160.

The table main body 120 is movable between a containing position (nearly a vertical state) which is faced to the back face of the seat-back and a using position (a horizontal state) by the rotational movement of the shaft 160.

At the using position, the front end of the shaft 160 is arranged at one end side (left end side facing the drawing) of the holding portion 320. The one end of the holding portion 320 is provided with the first lock member 220. The shaft 160 is locked unmovably relative to the first lock member 220.

At the containing position, the front end of the shaft 160 is moved to other end side (right end side facing the drawing) of the holding portion 320. The other end of the holding portion 320 is provided with the second lock member 240. The shaft 160 is locked unmovably relative to the second lock member 240.

However, in this structure, the plurality of lock members are indispensable constitution of the table. Therefore, a number of parts of the table is increased. In addition, plurality lock members are provided at inside of the holding portion. Therefore, the table constitution becomes complicated.

SUMMARY OF THE INVENTION

The present invention can include a vehicle seat having a table, the table including a table main body, a shaft member, a first hinge structure that pivotably connects the table main body to one face of the vehicle seat and a second hinge structure that pivotably connects the shaft member to the one face of the vehicle seat. The table main body includes a holding member which is capable of slidably holding a front end portion of the shaft member and a lock member which is capable of engaging with the shaft member, and the lock member is provided at a position different from the holding member. Further, the table main body is movable between a containing position constituting a state of facing the one face of the vehicle seat and a using position constituting substantially a horizontal state by movement of the shaft member, and the lock member is engaged with a front end side portion of the shaft member at the using position and engaged with a back end side portion of the shaft member at the containing position

BRIEF DESCRIPTION OF THE DRAWINGS

FIG. 5(*b*) is a cross-sectional view of the clip at the containing position.

DETAILED DESCRIPTION OF THE INVENTION

Each of the additional features and teachings disclosed above and below may be utilized separately or in conjunction with other features and teachings to provide a vehicle seat Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Hereafter, a description will be given, referring FIGS. 1 to 5, of a best mode for carrying out one aspect of the invention. In each figure, a reference letter F will be given to a front side of a vehicle seat, a reference letter B to a back side of a vehicle seat. A front and rear direction of the respective members of a table in a using position is determined in accordance with a front and rear direction of a vehicle seat.

Figure 1:
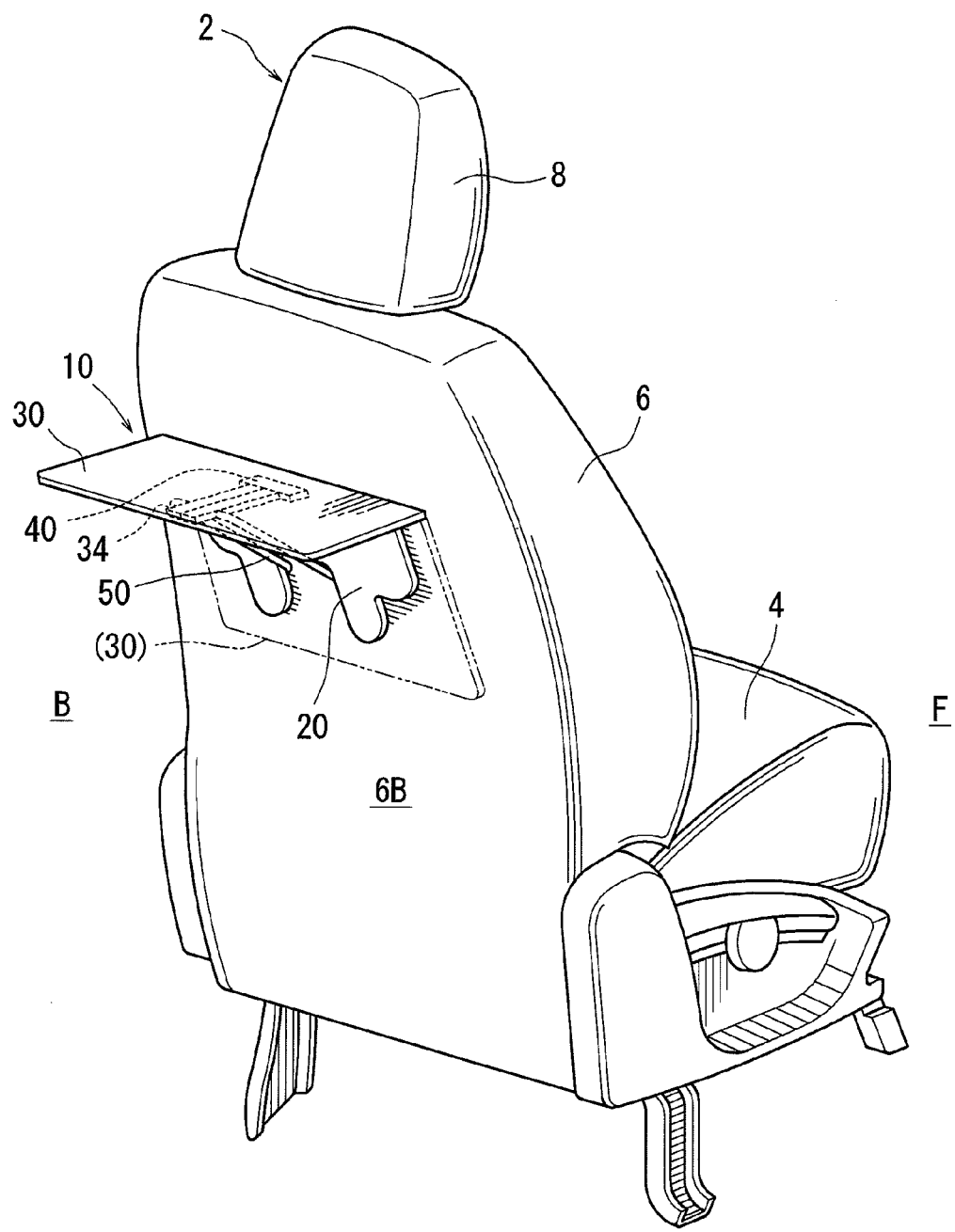
FIG. 1 is a perspective view of a back side of a vehicle seat.

A vehicle seat 2 includes a seat-cushion 4 and a seat-back 6 and a seat headrest 8 (refer to FIG. 1). A back side of the vehicle seat 2 can be arranged with other seat (not illustrated). A back face (6B) of the seat-back 6 is arranged with a table 10.

(Basic Constitution of Table)

Figure 2:
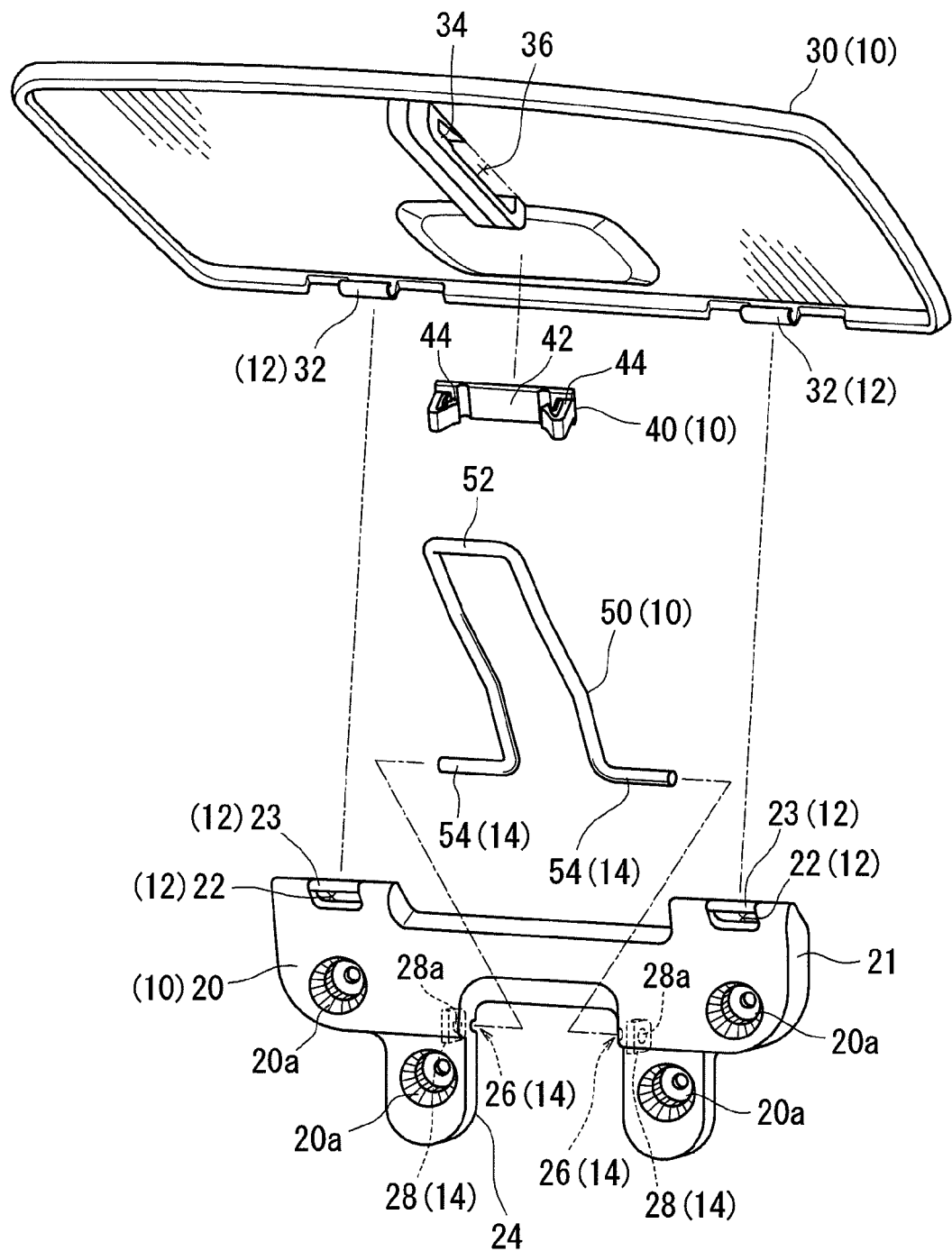
FIG. 2 is a disassembled perspective view of a table.

Referring to FIG. 1 and FIG. 2, the table 10 includes a bracket 20, a table main body 30 (substantially in a rectangular shape) and a shaft member 50 (substantially in a U-like shape). The bracket 20 is arranged at a back face (6B) of the seat-back 6. The shaft member 50 supports the table main body 30.

The table main body 30 is attached pivotably to the bracket 20 by a first hinge structure 12. The shaft member 50 is pivotably attached to the bracket 20 by a second hinge structure 14.

A back face of the table main body 30 is provided with a holding portion 34 and a lock member 40. The holding portion 34 is a long plate member extended from a rear edge side to a center of the table main body 30. The holding portion 34 includes a guide hole 36. The guide hole 36 can slidably hold a front end portion 52 (connecting end) of the shaft member 50. The table main body 30 is supported by the front end portion 52 which is held by the holding portion 34.

The table main body 30 is movable between a containing position (state of broken line of FIG. 1) and a using position (state of bold line of FIG. 1) by the rotational movement of the shaft member 50. The table main body 30 at the containing position can face to the back face of the seat-back 6. The table main body 30 at the using position can become substantially a horizontal state. It is preferable for a table constitution that a number of parts thereof is as small as possible and as simple as possible.

According to the invention, numbers of parts of the bracket 20, the table main body 30 (lock member 40), the first hinge structure 12 and the second hinge structure 14 are reduced as less as possible to simplify.

(Bracket)

Figure 3:
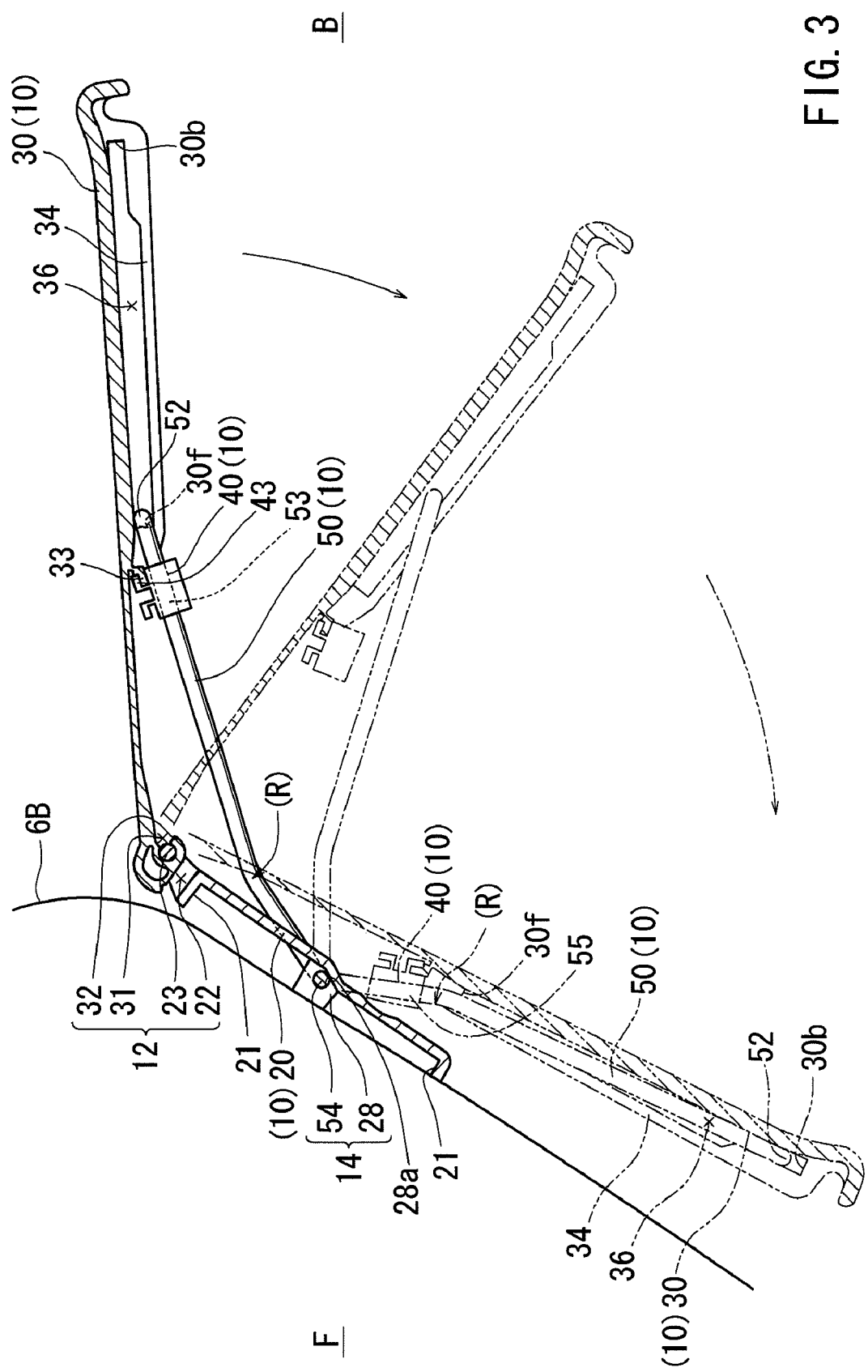
FIG. 3 is a vertical sectional view of a table.

Referring to FIG. 2 and FIG. 3, the bracket 20 is a flat plate member (simple constitution) substantially in a H-like shape (in front view). The bracket 20 includes a flange portion 21 and fastening portions (fastening holes 20*a*). The flange portion 21 is formed out of bending the edge portion of the bracket 20. The fastening portions (fastening holes 20*a*) is provided at four sides of a front face of the bracket 20.

The bracket 20 is arranged in a state of facing the back face of the seat-back 6. The flange portion 21 faces the back face of the seat-back 6. The bracket 20 can be fixed to the back face of the seat-back 6 at fastening portions (fastening holes 20*a*) with a bolt.

An upper portion of the bracket 20 is provided with an attaching hole 22 (constituent element of first hinge structure 12). The attaching hole 22 is a constitution for pivotably attaching the table main body 30. Left and right pair of the attaching holes 22 (substantially in rectangular shape) is formed in an upper edge of the bracket 20. Referring to FIG. 3, an upper side (hinge shaft portion 23) of the attaching hole 22 is constituted by substantially circular shape (vertical section).

Figure 4:
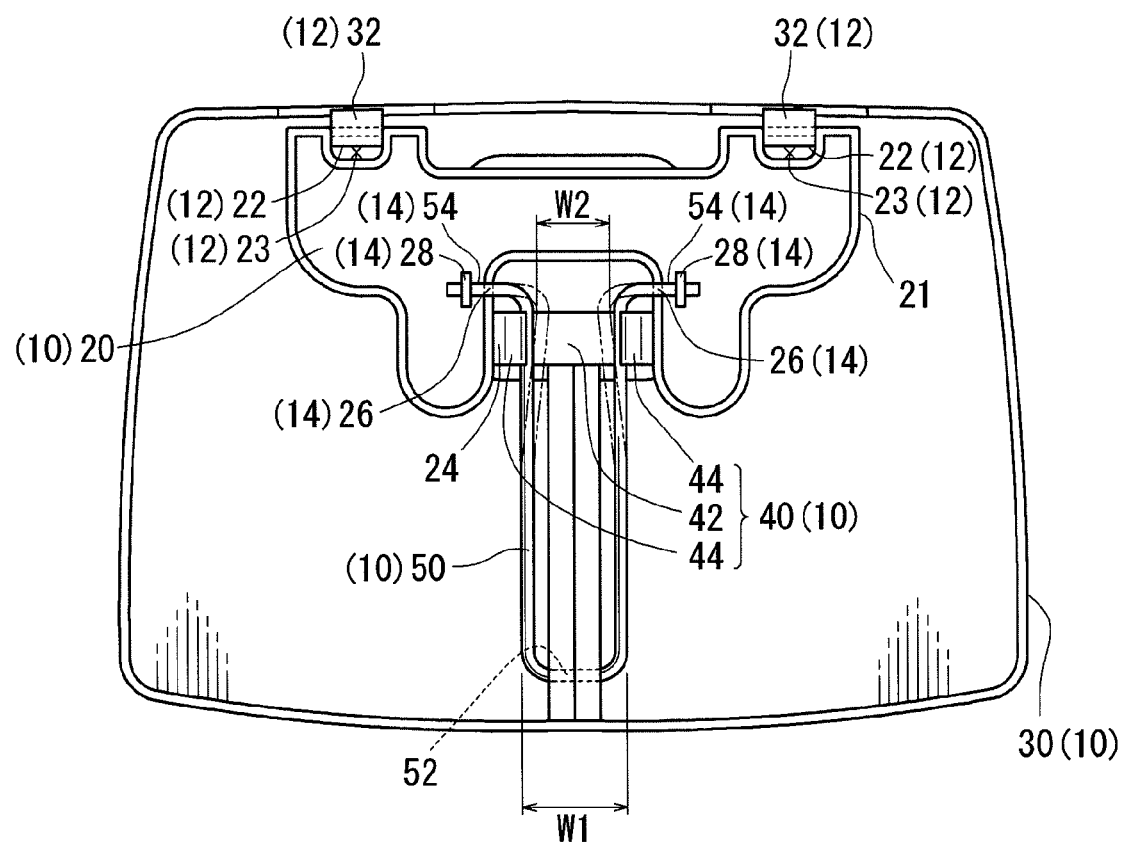
FIG. 4 is a front view of a back face of the table at a containing position.

Referring to FIG. 2 and FIG. 4, the bracket 20 includes a concave portion 24, a pair of bearing portion 26 and a pair of hinge hole portion 28. The concave portion 24 is formed in a lower portion of the bracket 20 and extends to the upper side of the seat The pair of bearing portions 26 are provided on left and right sides of an inner side of the concave portion 24. The bearing portion 26 is formed by notching an edge portion (flange portion 21) of the concave portion 24 in a semicircular shape.

The hinge hole portion 28 (constituent element of second hinge structure 14) has a flat plate shape. The hinge hole portion 28 is arranged in inner side of the bearing portion 26. Specifically, the pair of the hinge hole portions 28, 28 are arranged in shapes of facing each other to project from the back face of the bracket 20. The pair of hinge hole portions 28, 28 are respectively provided with hinge holes 28*a* at positions of facing the bearing portions 26.

(Table Main Body)

Referring to FIG. 2 and FIG. 3, the table main body 30 is provided with a pair of a hook portion 32 (constituent element of first hinge structure 12). The hook portion 32 is engageable with the attaching hole 22.

The pair of the hook portions 32 is arranged at a front edge of the table main body 30. Specifically, left and right pair of the hook portions 32 is arranged at the table main body 30 to be able to face the pair of attaching holes 22.

The hook portion 32 is projected in a shape of being bent from the front edge of the table main body 30 to a back side of a vehicle seat 2. The pair of hook portions 32 has substantially in J-like shape (vertical section). A front end side of the hook portion 32 is faced to the back face side of the table main body 30. There are some spaces (an opening portion 31) between the front end side of the hook portion 32 and the back face of the table main body 30.

(Lock member)

Referring to FIG. 2 and FIG. 3, the back face of the table main body 30 is provided with the lock member 40. The lock member 40 is provided contiguously to a front side of the holding portion 34 (provided at a position different from that of holding portion 34). The lock member 40 has a flexibility so as to be able to bend and it can be made of a resin or an elastomer.

The lock member 40 includes a base portion 42 in a flat plate shape and a pair of engaging portions 44, 44. The base portion 42 has substantially rectangular shape (in front view). The pair of engaging portions 44, 44 is formed to project on both sides of the base portion 42.

The lock member 40 is attached to the back face of the table main body 30 (refer to FIG. 3). Specifically, a bottom face of the base portion 42 has a locked piece 43. The locked piece 43 is substantially an alike member in a bent shape. On the other hand, a front end of the holding portion 34 has a locking piece 33. The locking piece 33 is substantially an L-like shape member in a shape of being inclined to a lower side. The base portion 42 is locked by a locking piece 33 so that the lock member 40 is attached to the back face of the table main body 30 in a shape of being inclined to a lower side.

Referring to FIG. 5, the engaging portion 44 is substantially in a J-like shape (in a side view). The engaging portion 44 includes a main wall 46, a sub wall 48 and a locking claw 45. The main walls 46 (comparatively thick-walled) are erected at both ends of the base portion 42. The sub wall 48 (comparatively thin-walled) is erected on an inner side of the main wall 46. The locking claw 45 is supported by the main wall 46 and the sub wall 48. The locking claw 45 is arranged on an inner side of the base portion 42 in a state of being inclined to an upper side.

In addition, the sub wall 48 has a bent shape. Specifically, the sub wall 48 is extended from an inner side of the locking claw 45 to a side of the main wall 46 substantially in parallel therewith, thereafter, bent to the base portion 42.

The lock member 40 (the locking claw 45) is engaged with the shaft member 50 so that the shaft member 50 (in a locking state) is inclined to an upper side of a vehicle seat.

(Shaft Member)

Referring to FIG. 3, the shaft member 50 is a wire member substantially in U-like shape and has a pair of free sides and other end side. The shaft member 50 is bent at a middle thereof (formed with bent portion R). In a state of attaching the shaft member 50, the bent portion R through a front end portion side can become proximate to the back face of the table main body 30.

The pair of free end sides of the shaft member 50 is opposed to the front end portion 52 and is bent in directions of being remote from each other. The pair of free end sides form respective inserting portions 54 (constituent elements of second hinge structure 14). The pair of free end sides (the inserting portion 54) can be bend easier compared to the front end portion 52.

A width dimension W1 of the shaft member 50 (in a free state) is set to be more or less narrower than a width dimension of the pair of concave portions 24 (refer to FIG. 4). The shaft member 50 is pivotably arranged at the concave portion 24.

(First Hinge Structure)

The first hinge structure 12 includes the attaching hole 22 and the hook portion 32 (refer to FIG. 2).

The first hinge structure 12 is formed by engaging the hook portions 32 to the attaching holes 22 from a side of the back face of the seat-back 6 (refer to FIG. 3). The hook portion 32 is rotatable around an upper frame of the attaching hole 22 (hinge shaft portion 23). Therefore, the table main body 30 can pivotably be attached to the bracket 20 without interposing a hinge pin or the like.

Another seat (not illustrated) can be arranged to the behind the vehicle seat 2. The seat-back 6 of the vehicle seat 2 is reclined to the seat rear side so that the table 10 (the using position) may contact the seat-cushion (or the like) of other seat. Therefore, the potential remains for the table 10 to break or deteriorate due to this type of contact.

At this occasion, when the table main body 30 is impacted from the rear face side (due to contact with other seat), the hook portion 32 is drawn out (detached) from the attaching hole 22. Specifically, the table main body 30 is impacted from the back face side so that it is lifted to an upper side of the vehicle seat. When the table main body 30 is lifted, the hook portion 32 is caught by the hinge shaft portion 23. Then the hook portion 32 (hook portion 32 having flexibility) is bent to a lower side of the vehicle seat so that the opening portion 31 is expanded and the hook portion 32 is drawn out (detached) from the attaching hole 22. Therefore, when the table main body 30 is impacted from the back face side, the hook portion 32 can be detached from the attaching hole 22 so that destruction of the table 10 by the impact can be prevented or reduced.

(Second Hinge Structure)

Referring to FIG. 2, the second hinge structure 14 includes the hinge hole portion 28 and the inserting portion 54.

The bent portion R faces the back face of the table main body 30, and then the front end portion 52 of the shaft member 50 is inserted to the holding portion 34 (refer to FIG. 3). Then, referring to FIG. 2, the inserting portions 54 of the shaft member 50 is passed through the bearing portions 26 of the bracket 20 and inserted to the hinge hole portions 28 hinge holes 28a). Thereby, the second hinge structure 14 is formed. By inserting the inserting portion 54 to the hinge hole portion 28 of the back face of the bracket 20 (the flat plate shape) so that the two members (the shaft member 50 and the bracket 20) can comparatively simply be attached to each other and the table 10 is constructed simply.

(Using Position of the Table)

At the using position of the table 10 (bold line state of FIG. 3), the front end portion 52 is arranged at one end 30f of the holding portion 34. At this occasion, the front end side of the shaft member 50 (one portion 53) can be arranged proximate to the lock member 40 so that one portion 53 can be engaged with the lock member 40. One portion 53 is proximate to the front end portion 52 (one portion 53 is different from front end portion 52).

The lock member 40 can be engaged with the one portion 53 to restrict a relative movement of the shaft member 50 so that the table main body 30 at the using position is stabilized Then, the shaft member 50 is pivoted to the seat lower side so that the one portion 53 is detached from the lock member 40. Thereby, the shaft member 50 is detached from the back face of the table main body 30 (refer to two-dotted line state without notation of FIG. 3).

Figure 5A:
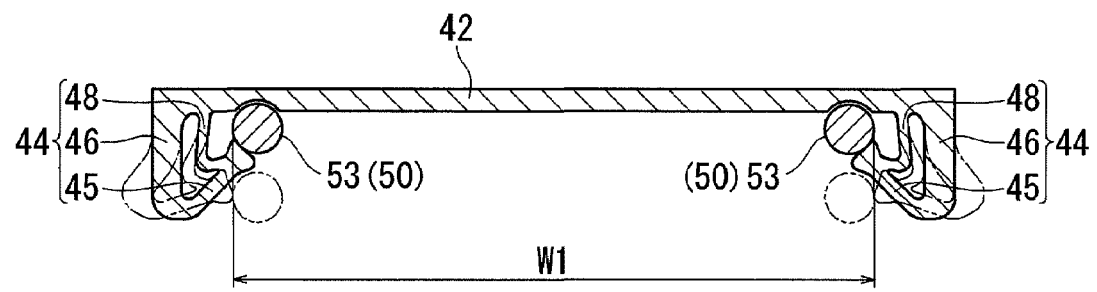
FIG. 5(*a*) is a cross-sectional view of a clip at a using position.

Incidentally, the one portion 53 (front end side of shaft member 50) is difficult to detach from the lock member 40 (Refer to FIG. 5(a)). This is because that front end side of shaft member 50 (a pair of the one portions 53, 53) is detached from the lock member 40 by maintaining the width dimension W1. The one portion 53 is detached by bending both of the main wall 46 and the sub wall 48. Therefore, the one portion 53 is difficult to be detached from the lock member 40.

In other words, by the main wall 46 and the sub wall 48, the one portion 53 and the lock member 40 are engaged with each other slightly strongly. Therefore, a force of engaging the lock member 40 becomes strong so that the table main body 30 (using position) is stably supported by the shaft member 50.

(Containing Position of the Table)

At the containing position of the table 10 (two-dotted broken line state of FIG. 3), the front end portion 52 is arranged at other end 30b of the holding portion 34. At this occasion, the side of the inserting portion of the shaft member 50 (other portion 55) can be arranged proximate to the lock member 40 so that other portion 55 can be engaged with the lock member 40. Other portion 55 is proximate to the inserting portion 54 (other portion 55 is different from the inserting portion 54).

The lock member 40 can be engaged with the other portion 55 to restrict a relative movement of the shaft member 50 so that the table main body 30 at the containing position is stabilized.

Figure 5B:
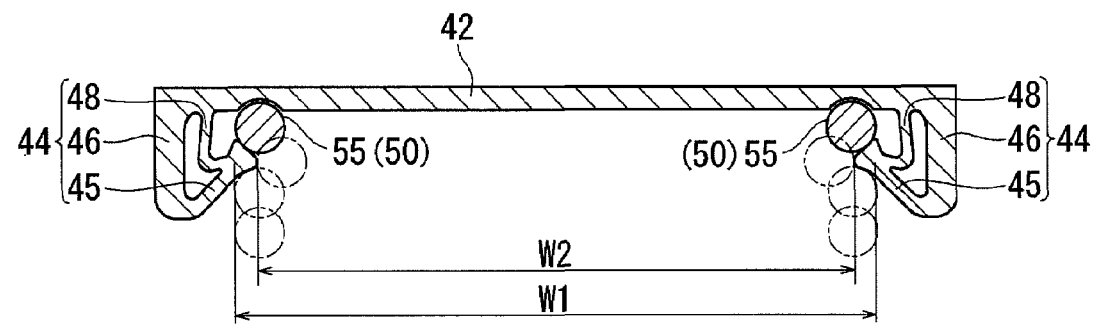
Figure 6:
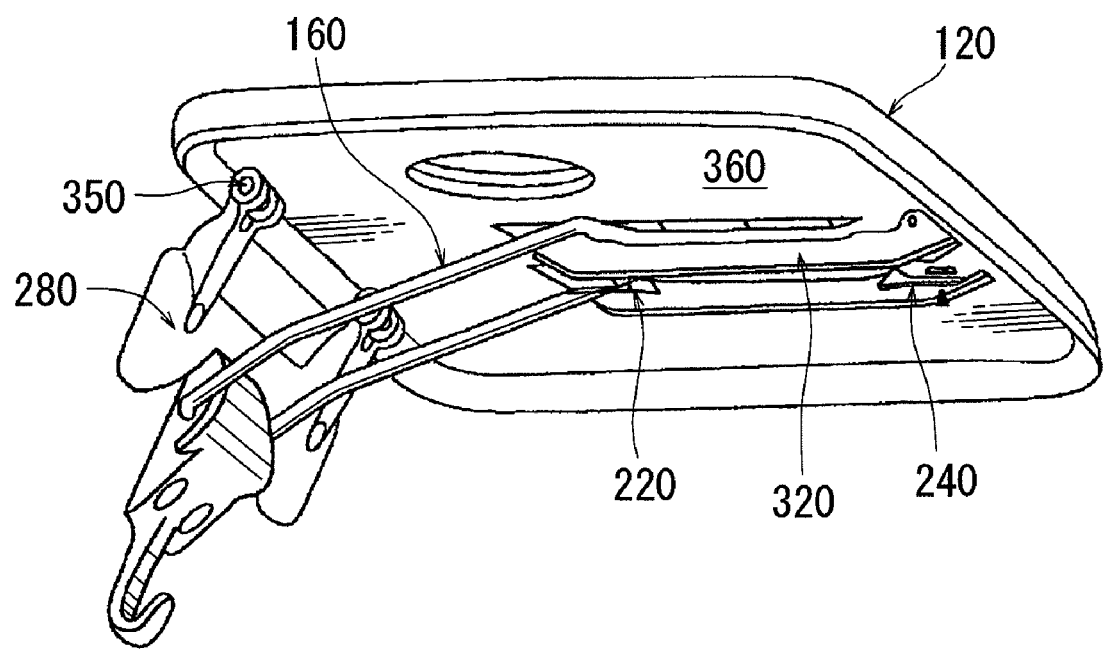
FIG. 6 is a perspective view of a vehicle seat of a related art.

Incidentally, the other portion 55 (inserting side of shaft member 50) is easier to detach from the lock member 40 (Refer to FIG. 5(b)). Referring to FIG. 4, this is because that inserting side of shaft member 50 (a pair of the other portions 55, 55) is engaged with the lock member 40 in a state of being bent to an inner side (width dimension W2 narrower than width dimension W1). Referring to FIG. 5 (b), the pair of other portions 55, 55 are locked with the locking claws 45 by maintaining the width dimension W2. Therefore, the pair of other portions 55, 55 is engaged with the locking claws 45 by mainly bending only the sub walls 48.

In other words, the other portions 55 and the lock member 40 are engaged with each other loosely. Therefore, a force of engaging the lock member 40 becomes weak and the table main body 30 (containing position) can easily be displaced at the using position.

According to the embodiment, the lock member 40 is engaged with the one portion 53 at the using position of the table main body 30. In addition, the lock member 40 is engaged with the other portion 55 at the containing position of the table main body 30. The table main body 30 can stably be held at the respective positions by the lock member 40 (single lock member) so that the constitution of the table 10 can be simple.

In addition, the number of parts of the respective constituent elements (bracket 20, first hinge structure 12 and second hinge structure 14) are reduced (constructed by simple constitution).

Alternative Embodiments

The vehicle seat having a table of the present invention is not limited to the previously described embodiment, and therefore it is possible to adopt various other modifications hereafter described.

(1) As described above, the table 10 can be arranged at the back face of the seat-back 6. The table 10 can be arranged at various kinds of faces of the vehicle seats 2 (for example, a side face of an armrest provided at the seat-back 6, a side face of a console box or the like provided at the vehicle seats 2).

As described above, the table main body 30 can be the flat plate shape (constituted by simple shape). The table member can be provided with a cup holder or the like so that use of the table main body is improved.

The back face of the table main body or the back face of the bracket can pertinently be formed with a reinforcing structure of a rib or the like.

(2) As described above, the back face of the table main body 30 can be supported by the shaft member 50. Different therefrom, a surface of the table main body 30 can be supported by the shaft member 50.

(3) As described above, the first hinge structure 12 and the second hinge structure 14 can be provided at the bracket 20. Different therefrom, the one face of the vehicle seat 2 can directly be provided with the first hinge structure 12 and the second hinge structure 14. In other words, the first hinge structure 12 and the second hinge structure 14 can be provided at a member different from the bracket 20.

The bracket 20 can be attached to the back face of the seat-back 6 by way of an attaching bracket (not illustrated). The bracket 20 can directly be attached to the back face of the seat-back 6.

(4) The first hinge structure 12 can be constructed by a constitution of attaching the table main body 30 to the bracket 20 by way of a hinge pin.

A number of the hook portions 32 and a number of the attaching holes 22 can be single or plural.

A shape of the attaching hole can pertinently be changed such as a circular shape, a semicircular shape, a polygonal shape or the like. The shape of the hook portion can take various kinds of shapes in correspondence with shapes of the attaching hole.

(5) The second hinge structure 14 can be constructed by attaching the inserting portion 54 of the shaft member 50 to a lower portion (projected portion substantially in semicircular shape) of the bracket 20.

(6) As described above, the lock member 40 can be positioned contiguous to the holding portion 34. The lock member 40 can be positioned remote from the holding portion (position different from that of holding portion) so far as the lock member 40 can be locked by the one portion and the other portion of the shaft member.

As described above, the lock member 40 can be engaged with the two free ends of the shaft member 50. The lock member 40 can also be engaged with only one free end of the shaft member.

As described above, the lock member 40 can be provided with the pair of engaging portions 44 (main walls and sub walls and the locking claws). The lock member 40 can be provided with only the locking claws and main walls.

(7) As described above, the locked piece 43 of the base portion 42 can be locked by the locking piece 33. Different therefrom, the shape of the base portion 42 can be a shape of being inclined to a lower side (substantially trapezoidal shape). Then, the lock member 40 can directly be attached (or integrally formed) to the back face of the table main body 30.

This invention claims:

1. A vehicle seat having a table, the table comprising:
 a table main body, a shaft member, a first hinge structure that pivotably connects the table main body to one face of the vehicle seat and a second hinge structure that pivotably connects the shaft member to the one face of the vehicle seat, and
 the table main body includes a holding member which is capable of slidably holding a front end portion of the shaft member and a lock member which is capable of engaging with the shaft member, wherein the lock member is provided at a position different from the holding member, and the table main body is movable between a containing position constituting a state of facing the one face of the vehicle seat and a using position constituting substantially a horizontal state by movement of the shaft member, wherein
 the lock member is engaged with a front end side portion of the shaft member at the using position and engaged with a back end side portion of the shaft member at the containing position.

2. The vehicle seat having the table according to claim 1, wherein the lock member includes a base portion and a pair of engaging portions.

3. The vehicle seat having the table according to claim 2, wherein the engaging portion includes a main wall, a sub wall and a locking claw.

4. The vehicle seat having the table according to claim 2, wherein the vehicle seat includes a bracket in a shape of a flat plate, and the bracket is connected to the one face the vehicle seat, and wherein the second hinge structure includes a hinge hole portion which is positioned at a back face of the bracket and the hinge hole portion defines an opening which is capable of inserting the shaft member.

5. The vehicle seat having the table according to claim 1, wherein the lock member is made of a resin or an elastomer.

6. The vehicle seat having the table according to claim 1, wherein the first hinge structure includes an attaching hole of the one face of the vehicle seat and a hook portion of the table main body and the hook portion is capable of engaging with the attaching hole, and wherein
 when the table main body is impacted from a side of the one face, the hook portion is detached from the attaching hole.

7. The vehicle seat having the table according to claim 1, wherein the vehicle seat includes a bracket in a shape of a flat plate, and the bracket is connected to the one face the vehicle seat, and wherein
 the second hinge structure includes a hinge hole portion which is positioned at a back face of the bracket, and the hinge hole portion defines an opening which is capable of inserting the shaft member.

\* \* \* \* \*